UNITED STATES PATENT OFFICE.

HERBERT WATKINS-PITCHFORD, OF WEYBRIDGE, ENGLAND.

NUTRITIVE PREPARATION.

1,165,925. Specification of Letters Patent. Patented Dec. 28, 1915.

No Drawing. Application filed September 4, 1914. Serial No. 860,304.

*To all whom it may concern:*

Be it known that I, HERBERT WATKINS-PITCHFORD, a subject of the King of Great Britain, residing at Weybridge, in the county of Surrey, England, have invented new and useful Improvements Relating to Nutritive Preparations, of which the following is a specification.

This invention relates to the preparation of food products and to the making up of such products in a palatable and convenient form suitable for ready assimilation.

It is the principal object of this invention to provide a nutritious meat product combined with a suitable vehicle for said product which will render the product palatable and convenient to be taken, which will assist in its assimilation, and which will also act as a preservative without the necessity of adding any other antiseptic.

Further objects are to make a fluid extract with such vehicle or vehicles which shall be free from water, and if required to combine with such extract other fluid materials such as cod liver oil with or without malt.

In carrying the invention into effect, lean meat is minced and is washed with warm water for the purpose of removing therefrom its salts and extractives. After this treatment the lean meat is digested with a solution containing a digestive ferment such as the juice of the papaw fruit, papain, pepsin or the like. The solution may be slightly acidulated by the addition for instance of a few drops of hydrochloric acid, although this is not essential. Soluble peptones are thus formed and these pass into solution. The digestion is allowed to take place while the solution is warm, the temperature being approximately 40° centigrade, while the duration of this operation may be two or three hours or even more. At the end of this period, the mixture is boiled for about half an hour whereby any suspended or coagulable matters are thrown down. The mass is strained and the solution is pressed out and filtered. It is then evaporated down preferably *in vacuo* to the consistency of a tenacious syrup.

In order to make a non-decomposing mixture which shall be palatable and easily swallowed, according to this invention the predigested meat product is then mixed with an excipient or vehicle such as glycerin, refined liquid paraffin, or bland (non-irritant) vegetable oils capable of forming an intimate mixture or emulsion with the extract prepared as above. For example, if the product has been condensed to the consistency of a thick syrup, and if the excipient added is glycerin, the amount of glycerin added may be about 20% by volume of the total bulk. Such a preparation is then easily taken, it is wholesome and palatable, and it requires the addition or no other antiseptic or preservative matter to prevent it from decomposing when kept in the ordinary manner.

A further feature of the invention consists in the elimination of all water from the preparation, and this is effected by concentration *in vacuo* in the presence of the excipient. The effect of this is to abstract completely the water present, leaving the predigested proteid matter in combination with the excipient in the highest state of concentration but still in a fluid and convenient and preserved form.

A further feature of the invention consists in combining with the fluid material so prepared, other valuable food constituents or medicaments such as cod liver oil with or without malt added thereto. It is found that the highly concentrated fluid consisting of the excipient and the predigested proteid matter will mix in practically any proportion with cod liver oil with or without the addition of malt, and the mixtures so formed will still be concentrated, palatable, easy to take, and will be preserved without the addition of any objectionable antiseptic or other preservative.

Having thus described my invention, what I claim as new and desire to secure by Letters Patent is:

1. A process for the preparation of a predigested meat product in a palatable form, consisting in dissolving out from the meat the salts and extractives, adding a ferment capable of preparing a digested product therefrom, separating and concentrating the digested product, and combining with it an excipient capable of rendering the mixture palatable and nondecomposing.

2. A process for the preparation of a predigested meat product in a palatable form, consisting in dissolving out from the meat the salts and extractives, adding a ferment capable of preparing a digested product therefrom, separating and concentrating the product, combining with it an excipient capable of rendering the mixture palatable and non-decomposing, and then concentrating the mixture *in vacuo*, whereby the remaining water is expelled leaving a fluid mixture of excipient and predigested meat product.

3. As an article of manufacture, a product consisting of a mixture of predigested proteid matter obtained from meat after the removal of the salts and extractives therefrom, and an excipient capable of mixing with the digested proteid matter, and preserving the same.

In witness whereof I have hereunto signed my name this 26th day of August, 1914, in the presence of two subscribing witnesses.

H. WATKINS-PITCHFORD.

Witnesses:
HUBERT A. GILL,
H. W. BLAKE.

Copies of this patent may be obtained for five cents each, by addressing the "Commissioner of Patents. Washington, D. C."